(12) United States Patent
Miyata et al.

(10) Patent No.: US 7,362,925 B2
(45) Date of Patent: Apr. 22, 2008

(54) CONTROL METHOD AND CONTROL APPARATUS OF OPTICAL DEVICE

(75) Inventors: Hideyuki Miyata, Kawasaki (JP); Hiroshi Onaka, Kawasaki (JP); Tadao Nakazawa, Kawasaki (JP); Yutaka Kai, Kawasaki (JP); Hiroshi Miyata, Kawasaki (JP); Yoichi Takasu, Kawasaki (JP); Naoki Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 11/144,607

(22) Filed: Jun. 6, 2005

(65) Prior Publication Data

US 2005/0226550 A1 Oct. 13, 2005

Related U.S. Application Data

(62) Division of application No. 10/106,315, filed on Mar. 27, 2002, now Pat. No. 6,934,433.

(30) Foreign Application Priority Data

Dec. 28, 2001 (JP) ............................. 2001-399237

(51) Int. Cl.
*G02F 1/1335* (2006.01)
(52) U.S. Cl. .......................................... 385/14; 385/16
(58) Field of Classification Search .................. 385/14, 385/16
See application file for complete search history.

(56) References Cited

U.S. PATENT DOCUMENTS

| | | | |
|---|---|---|---|
| 5,218,653 A | 6/1993 | Johnson et al. | |
| 5,652,809 A | 7/1997 | Aronson | |
| 5,659,560 A | 8/1997 | Ouchi et al. | 372/27 |
| 5,718,226 A | 2/1998 | Riza | 600/437 |
| 5,832,014 A | 11/1998 | Johnson | 372/32 |
| 5,850,492 A | 12/1998 | Morasca et al. | |
| 5,966,237 A * | 10/1999 | Sugaya et al. | 359/341.41 |

(Continued)

FOREIGN PATENT DOCUMENTS

EP 0 762 677 3/1997

(Continued)

OTHER PUBLICATIONS

Japanese Patent Office Action mailed Aug. 14, 2007, in corresponding Japanese Patent Application No. 2001-399237.

*Primary Examiner*—K. Cyrus Kianni
(74) *Attorney, Agent, or Firm*—Staas & Halsey LLP

(57) ABSTRACT

The present invention aims at providing a control method and a control apparatus for controlling the operation setting of an optical device with high accuracy, so as to reliably obtain characteristics according to a desired relationship to be set corresponding to a signal light, immediately after the control start. To this end, the control apparatus of the present invention comprises an optical coupler that branches a part of a main signal light input to the optical device, a monitoring optical device that operates in accordance with a control parameter same as for the optical device, and processes the monitor light branched by the optical coupler, a light receiver that receives the monitor light processed by the monitoring optical device, a detecting circuit that detects a relationship between the monitor light received by the light receiver, and the wavelength or optical power of the signal light, and a controlling circuit that adjust the control parameter for the optical device to control the operation setting, based on the relationship detected by the detecting circuit, so that characteristics of the optical device become capable of realizing the relationship to be set corresponding to the signal light.

2 Claims, 11 Drawing Sheets

U.S. PATENT DOCUMENTS

| | | | |
|---|---|---|---|
| 5,995,274 A * | 11/1999 | Sugaya et al. | 359/337 |
| 6,005,995 A | 12/1999 | Chen et al. | 385/24 |
| 6,025,947 A * | 2/2000 | Sugaya et al. | 398/97 |
| 6,144,485 A * | 11/2000 | Sugaya et al. | 359/337 |
| 6,157,481 A * | 12/2000 | Sugaya et al. | 359/337 |
| 6,198,572 B1 * | 3/2001 | Sugaya et al. | 359/337 |
| 6,289,023 B1 | 9/2001 | Dowling et al. | 370/419 |
| 6,369,923 B1 | 4/2002 | Kuo et al. | 359/133 |
| 6,377,395 B2 * | 4/2002 | Sugaya et al. | 359/341.41 |
| 6,426,832 B1 | 7/2002 | Kinoshita | 359/337 |
| 6,438,149 B1 | 8/2002 | Tayebati et al. | 372/45 |
| 6,456,411 B1 | 9/2002 | Ishikawa et al. | 359/187 |
| 6,483,636 B1 * | 11/2002 | Sugaya et al. | 359/349 |
| 6,501,773 B1 | 12/2002 | Volz et al. | 372/29.02 |
| 6,646,791 B2 * | 11/2003 | Sugaya et al. | 359/341.41 |
| 6,657,778 B1 * | 12/2003 | Motoshima et al. | 359/337.1 |
| 2001/0030786 A1 | 10/2001 | Takahashi et al. | 359/127 |
| 2005/0046927 A1 * | 3/2005 | Sugaya et al. | 359/337 |

FOREIGN PATENT DOCUMENTS

| | | |
|---|---|---|
| EP | 1 130 822 | 9/2001 |
| JP | 62-15523 | 1/1987 |
| JP | 1-189976 | 7/1989 |
| JP | 06318910 A * | 11/1994 |
| JP | 08-114776 | 5/1996 |
| JP | 08-211349 | 8/1996 |
| JP | 08-286160 | 11/1996 |
| JP | 09-090303 | 4/1997 |
| JP | 11-064809 | 3/1999 |
| JP | 11-183945 | 7/1999 |
| JP | 2001-298413 | 10/2001 |

* cited by examiner

| PROPAGATION DIRECTION OF LIGHT AND SAW | WAVELENGTH Λ OF SAW SENSED BY LIGHT |
|---|---|
| STATIC (ACOUSTIC VELOCITY = 0) | Λ₀ — PROPAGATION DIRECTION OF LIGHT |
| FORWARD DIRECTION | Λ₊ — PROPAGATION DIRECTION OF SAW |
| REVERSE DIRECTION | Λ₋ — PROPAGATION DIRECTION OF SAW |

Δλ

REVERSE DIRECTION   STATIC   FORWARD DIRECTION

λ₋   λ₀   λ₊

SELECTED WAVELENGTH

λ1=λ2=λ3

λ1　λ2　λ3

CONTROL METHOD AND CONTROL APPARATUS OF OPTICAL DEVICE

This application is a divisional of application Ser. No. 10/106,315, filed Mar. 27, 2002, now allowed as U.S. Pat. No. 6,934,433.

BACKGROUND OF THE INVENTION (1) Field of the Invention

The present invention relates of a control technique of an optical device to be utilized in various equipments for optical communication, in particular, to a control method and a control apparatus for controlling characteristics of optical device with high accuracy immediately after the starting of control operation.

(2) Related Art

There have been demanded large capacities and ultra-long distance of backbone networks with an explosive increase of data communication demand centered on Internet traffic. Further, at the same time, there have been demanded to realize the high reliable, flexible and economical networks, since the users require a great variety of services.

At present situations, the large capacities and ultra-long distance of optical networks have been remarkably developed by the wavelength-division multiplexing (WDM) transmission technique and optical amplification technique, thereby enabling to reduce the cost of transmission paths. However, in a case of increasing information processing ability of network node following the high-speed and large capacities of transmission signals, a conventional photoelectrical conversion and electric switch system results in an increase in node cost and a large scale. From the view point of these backgrounds, it is expected to develop an optical add and drop multiplexing (OADM) apparatus or an optical cross-connecting (OXC) apparatus that performs various processing in an optical wavelength region, by replacing large scaled electronic circuits for optical devices, in order to economize and miniaturize the node.

In these apparatuses, there are utilized many optical devices, such as, an optical switch having functions for switching ON/OFF of light, for attenuating the light, for switching to 1×n, or the like, an optical wavelength filter that separates a signal light for each wavelength, or the like. Among such optical devices as mentioned above, optical devices capable of collectively processing a desired plurality of wavelength lights for a WDM signal light are important key devices, in order to realize the OADM apparatus, the OXC apparatus and the like.

In the network node utilizing the OADM apparatus and the like including optical devices, such as, the optical wavelength filer or optical switch, for the purpose of flexibly managing networks, it is important to variably control characteristics of optical device corresponding to a desired plurality of wavelength lights, to enable to perform the collective process of arbitrary wavelengths for WDM signal light.

For example, in an optical wavelength filter that performs a process for collectively blocking optical signals of a plurality of wavelengths (blocking process) from passing through, a process for collectively dropping optical signals of a plurality of wavelengths (dropping process) and the like, it is required to control variable filter characteristics so that the center wavelength at a transmission band or blocking band is completely coincident with the wavelength of a desired optical signal to be selectively separated, to thereby enable to perform the collective process of arbitrary wavelengths for a WDM signal light. If the center wavelength in the optical wavelength filter does not coincide with the selected wavelength, in the blocking process, an extinction ratio is deteriorated or the passing of optical signal of other wavelength is erroneously blocked. Further, in the dropping process, an insertion loss at the node is increased or the optical signal of other wavelength is erroneously dropped. An occurrence of such situations should be avoided, since such situations become fatal for the processing operations of OADM apparatus or the like that constitutes network node.

Moreover, for example, in an optical switch that performs a switching process of optical paths for signal light, it is required to variably control with high accuracy switching element performance corresponding to a relation between input and output, to thereby enable to perform the accurate switching process of a plurality of optical paths. If the control accuracy in the optical switch is low, since, such as, an insertion loss at the switch is increased, an occurrence of such a situation should be avoided, as well as in the optical wavelength filter.

As a method to variably control characteristics of the optical device according to a desired relationship to be set corresponding to signal light to be processed in the above manner (for example, the relationship of selected wavelength, optical path or the like), it can be considered a method to monitor an operation state of the optical device, to thereby control the operation setting of the optical device based on the monitoring result. Specifically, in a case where the characteristics of the optical device are changed by an influence of the deterioration due to time lapse, an environment change, a control error or the like, or the wavelengths of the optical signals to be input to the optical device is fluctuated by unstable wavelengths in a transmission light source, it is possible to monitor a processing result at the optical device, to thereby feedback control a control parameter in accordance with the monitoring result.

When the consideration is made on such a feedback control of the operation setting of the optical device as mentioned above, however, there is a problem in that it is difficult to reliably obtain the characteristics of the optical device according to a desired relationship. Namely, if the monitoring result at the starting of control is different from that obtained from a desired characteristic, a certain control period of time is required until the characteristics of the optical device reach an allowable range by the feedback control of control parameter. Therefore, it is difficult to ensure the characteristics of the optical device during this period of time. In the optical devices to be utilized in the OADM apparatus or the OXC apparatus, if the process of blocking the passing of desired wavelength light, dropping desired wavelength light, switching the optical paths or the like is erroneously performed, the services to the user shall be suspended. Therefore, the operation control of the optical device requires to be at high accuracy from the initial condition thereof. In order to satisfy such a demand, a control technique of optical device that dissolve the problems in the feedback control as mentioned above is indispensably required.

SUMMARY OF THE INVENTION

The present invention has been achieved in view of the above problems, and an object of the present invention is to provide a control method and a control apparatus for controlling with high accuracy the operation setting of an optical device so that characteristics of the optical device according to a desired relationship to be set corresponding to a signal light can be reliably obtained immediately after the control start.

In order to achieve the above object, the present invention provides a control method for controlling the operation setting of an optical device that processes a signal light, so as to enable to obtain characteristics of the optical device capable of realizing a relationship to be set corresponding to the signal light, wherein a part of the signal light to be input to the optical device is branched as a monitor light; the branched monitor light is processed by a monitoring optical device that operates in accordance with a control parameter same as for the optical device; the monitor light processed by the monitoring optical device is received; a relationship between the received monitor light, and at least one of the wavelength and optical power of the signal light is detected; and, based on the detected relationship, the control parameter for the optical device is adjusted, to control the operation setting so that the characteristics of the optical device become capable of realizing the relationship to be set corresponding to the signal light.

A control apparatus according to the present invention, for controlling the operation setting of an optical device that processes a signal light, so as to enable to obtain characteristics of the optical device capable of realizing a relationship to be set corresponding to the signal light, comprises: a branching section that branches a part of the signal light to be input to the optical device as a monitor light; a monitoring optical device that operates in accordance with a control parameter same as for the optical device, and processes the monitor light branched by the branching section; a receiving section that receives the monitor light processed by the monitoring optical device; a detecting section that detects a relationship between the monitor light received by the receiving section and at least one of the wavelength and optical power of the signal light; and a controlling section that, based on the relationship detected by the detecting section, adjusts the control parameter for the optical device, to control the operation setting so that the characteristics of the optical device become capable of realizing the relationship to be set corresponding to the signal light.

According to the control method and control apparatus of the optical device as mentioned above, the monitor light branched from the signal light to be input to the optical device is processed by the monitoring optical device that operates with the control parameter same as for the optical device, actual characteristics in the optical device for main signal is judged based on the relationship between the monitor light and the wavelength or optical power of the signal light, and the control parameter for the optical device is adjusted to thereby control the operation setting of the optical device so as to enable to obtain the characteristics capable of realizing a desired relationship to be set corresponding to the signal light. Thus, it becomes possible to reliably ensure the desired characteristics of the optical device immediately after the starting or the alteration of setting.

Further objects, features and advantages of the present invention will become more apparent from the following description of preferred embodiments when read in conjunction with the accompanying drawings.

BRIEF EXPLANATION OF THE DRAWINGS

FIG. 12 is a conceptual diagram for explaining filter characteristics of an optical filter of rejection type, in which

FIG. 13 is a diagram for explaining the deviation of selected wavelengths inherent to the substrate on which three-staged AOTFs are integrated, in which

DETAILED DESCRIPTION OF THE PREFERRED EMBODIMENTS

Embodiments of the present invention will be described based on the drawings.

Figure 1:
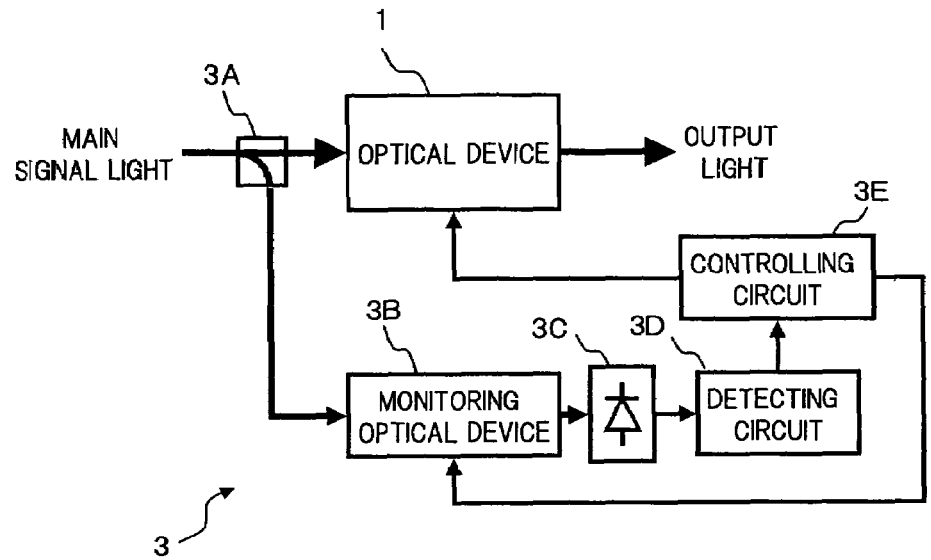
FIG. 1 is a block diagram showing a first embodiment of a control apparatus of an optical device according to the present invention.

FIG. 1 is a block diagram showing a first embodiment of a control apparatus of an optical device according to the present invention.

In FIG. 1, a control apparatus 3 in the first embodiment is to control the operation setting of an optical device 1 that executes a required process on a signal light, so as to enable to obtain characteristics of the optical device 1 capable of realizing a desired relationship to be set corresponding to the input signal light. Here, the control apparatus 3 comprises, for example, an optical coupler 3A as a branching section, a monitoring optical device 3B, a light receiver 3C as a receiving section, a detecting circuit 3D as a detecting section and a controlling circuit 3E as a controlling section.

The optical coupler 3A branches a part of the signal light to be input to the optical device 1 (to be referred as main signal light), to send a branched light to the monitoring optical device 3B. It is possible to arbitrarily set a branching ratio by this optical coupler 3A within a range where the process of the main signal light at the optical device 1 and subsequent stages are not influenced.

The monitoring optical device 3B is a separately provided optical device similar to the optical device 1 that processes the main signal light, and input with the signal light branched by the optical coupler 3A (to be referred as monitor light), to operate in accordance with a control parameter same as for the optical device 1. The monitor light processed by this monitoring optical device 3B is sent to the light receiver 3C.

The light receiver 3C receives an output light from the monitoring optical device 3B and converts the output light into an electrical signal, to output the electrical signal to the detecting circuit 3D. The detecting circuit 3D detects a relationship between the monitor light processed by the monitoring optical device 3B and at least one of the wavelength and optical power of the main signal light, based on the electrical signal from the light receiver 3C, to transmit the detection result to the controlling circuit 3E.

The controlling circuit 3E controls the operation setting of the optical device 1 based on the detection result at the detecting circuit 3D, so that the characteristics of the optical device 1 become capable of realizing a desired relationship to be set corresponding to the main signal light. Specifically, by utilizing the relationship between the monitor light detected by the detecting circuit 3D and the wavelength or optical power of the main signal light, characteristics that shall be actually obtained at the optical device 1 for main signal are judged, and a setting value of optimum control parameter by which a difference between the judged characteristics and the characteristics capable of realizing the above desired relationship is dissolved or reduced, is determined, to control the operation of the optical device 1. Further, the controlling circuit 3E controls the control parameter for the monitoring optical device 3B so that the operation setting of the monitoring optical device 3B becomes the same as the operation setting of the optical device 1 for main signal.

Next, an operation of the first embodiment will be described hereafter.

In the control apparatus 3 of the optical device 1 having the constitution as mentioned above, a part of the main signal light to be input is branched by the optical coupler 3A, and the monitor light processed by the monitoring optical device 3B that operates in accordance with the control parameter same as for the optical device 1 for main signal, is photo-electrically converted by the light receiver 3C and thereafter sent to the detecting circuit 3D. Then, at the detecting circuit 3D, the relationship between the monitor light processed by the monitoring optical device 3B and the wavelength or optical power of the main signal light is detected based on the electrical signal from the light receiver 3C, to be transmitted to the controlling circuit 3E as information for judging actual characteristics at the optical device 1 for main signal. AT the controlling circuit 3E, the operation setting of the optical device 1 required for obtaining characteristics by which the desired relationship to be set corresponding to the main signal light is realized, is judged, and the control parameter for the optical device 1 is controlled in accordance with the judgment result.

Specifically, for example, in a case where the optical device 1 is an optical wavelength filter that performs the process for collectively blocking the passing of optical signals of a plurality of wavelengths included in the main signal light (blocking process), there is used, as the monitoring optical device 3, an optical wavelength filter that operates in accordance with the control parameter same as for the optical device 1 and has transmission wavelength characteristics correlated with those of the optical device 1, that is, an optical wavelength filter capable of collectively dropping optical signals of a plurality of wavelengths that are blocked from passing through by the optical device 1. Then, a relationship between each of peak wavelengths of the plurality of optical signals dropped by the monitoring optical device 3 from the monitor light branched by the optical coupler 3A, and each of the wavelengths of the main signal light, is detected by the detecting circuit 3D, an error in each of the peak wavelengths detected by the detecting circuit 3D to each of the wavelengths of optical signals that are to be blocked from passing through by the optical device 1 is obtained by the controlling circuit 3E, and a value of the error is converted into a value corresponding to the control parameter for determining the selected wavelength of the optical device 1, to thereby determine the setting value of the control parameter with the error thereof compensated.

Moreover, for example, in a case where the optical device 1 is an optical wavelength filter that collectively drops optical signals of a plurality of wavelengths included in the main signal light (dropping process), there is used, as the monitoring optical device 3B, an optical wavelength filter capable of operating in accordance with the control parameter same as for the optical device 1 and performing the dropping process same as in the optical device 1 Then, a relationship between each of peak wavelengths of the plurality of optical signals dropped by the monitoring optical device 3 from the monitor light branched by the optical coupler 3A, and each of the wavelengths of the main signal light, is detected by the detecting circuit 3D, an error in each of the peak wavelengths detected by the detecting circuit 3D to each of the wavelengths of optical signals that are to be dropped by the optical device 1 is obtained by the controlling circuit 3E, and a value of the error is converted into a value corresponding to the control parameter for determining the selected wavelength of the optical device 1, to thereby determine the setting value of the control parameter with the error thereof compensated.

Further, for example, in a case where the optical device 1 is an optical switch that performs the switching process of optical paths for the main signal light, there is used, as the monitoring optical device 3B, an optical switch capable of operating in accordance with the control parameter same as for the optical device 1 and performing the switching process same as in the optical device 1. Then, a relationship between the peak power of each of the wavelengths of the monitor light that has been branched by the optical coupler 3A to be output with the optical paths thereof switched by the monitoring optical device 3B, and each of the wavelength light powers of the main signal light, is detected by the detecting circuit 3D. An error in the optical power detected by the detecting circuit 3D to the output power of optical signal of which optical paths are to be switched by the optical device 1 is obtained by the controlling circuit 3E, and a value of the error is converted into a value corresponding to the control parameter for determining the connection state of optical paths of the optical device 1, to thereby determine the setting value of the control parameter with the error thereof compensated.

In this way, according to the control apparatus 3 of the first embodiment, since the control of operation setting of the optical device 1 that processes the main signal light is performed based on the state of the monitor light processed by the monitoring optical device 3B that is separately provided and operates in accordance with the control parameter same as for the optical device 1, it becomes possible to ensure the characteristics of the optical device 1 capable of realizing a desired relationship to be set corresponding to the main signal light immediately after the operation start or the alteration of setting of the optical device 1. Namely, as mentioned above, in the case where the result of the process by the optical device 1 for main signal is directly monitored to feedback control the control parameter, there is a possibility that the main signal light shall be processed by the optical device 1 that has not yet obtained desired characteristics immediately after the control start. Contrary to this, if the monitoring optical device 3B that operates in accordance with the control parameter same as for the optical device 1 is separately provided to perform the control, it becomes possible to ensure the desired characteristics of the optical device 1 immediately after the control start, since it is judged based on the output light state of the monitoring optical device 3B whether or not the desired characteristics have been obtained immediately after the control start, and the operation setting of the optical device 1 for main signal is controlled in accordance with the judgment result.

As one example of the optical device 1, in the first embodiment, there has been described the optical wavelength filter that performs the blocking process or the dropping process, or the optical switch that performs the switching process of the optical paths. However, the optical devices to which the control technique according to the present invention is applicable are not limited to such specific examples.

Next, there will be described a second embodiment of the present invention.

Figure 2:
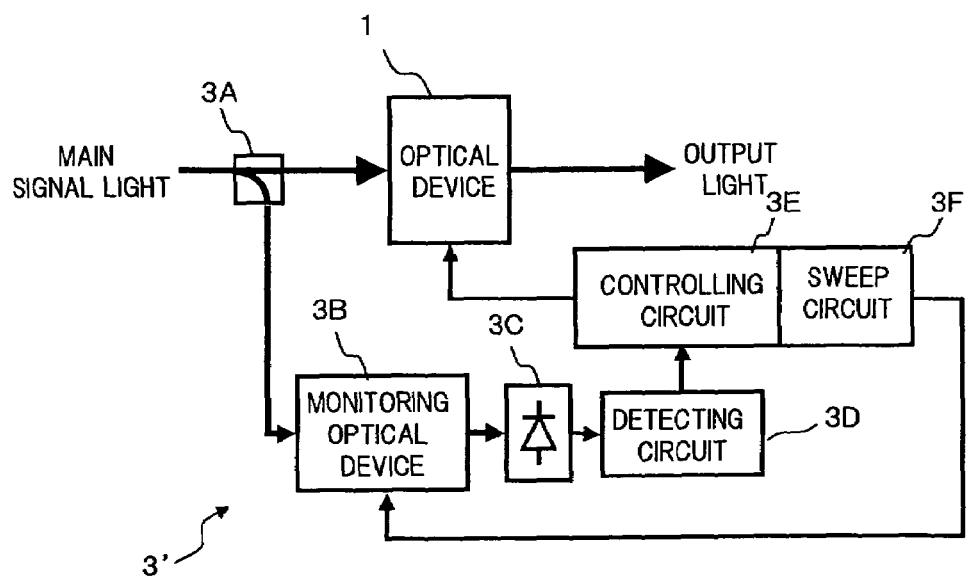
FIG. 2 is a block diagram showing a second embodiment of a control apparatus of an optical device according to the present invention.

FIG. 2 is a block diagram showing the second embodiment of a control apparatus of an optical device according to the present invention. Same components as those in the first embodiment shown in FIG. 1 are denoted by the same reference numerals and the descriptions thereof shall be omitted. Same rules shall be applied to the other embodiments.

In FIG. 2, a control apparatus 3' of the second embodiment is constituted such that, for the control apparatus 3 of the above mentioned first embodiment, a sweep circuit 3F as a sweeping section that sweeps the control parameter for the monitoring optical device 3B within a previously set range, is added to the controlling circuit 3E. Other components except for the sweep circuit 3F are the same as those in the first embodiment.

The sweep circuit 3F has a function for sweeping the control parameter for the monitoring optical device 3B independently of the control parameter for the optical device 1, and the sweeping range thereof is set within a variable range of the control parameter to be estimated from the desired relationship to be set corresponding to the main signal light.

In such a control apparatus 3' of the optical device 1, the monitor light branched by the optical coupler 3A is input to the monitoring optical device 3B for which control parameter is swept within a required range by the sweep circuit 3F so that the characteristics of the monitoring optical device 3B are changed, to be processed. At this time, the control parameter for the optical device 1 for main signal is controlled by the controlling circuit 3E independently of the control parameter for the monitoring optical device 3B, and therefore, is not swept. Relationships of the monitor light processed by the monitoring optical device 3B with the wavelength or optical power of the main signal light are detected corresponding to changes in characteristics of the monitoring optical device 3B, to be transmitted to the controlling circuit 3E as information for judging characteristics actually obtained by the optical device 1 for main signal. At the controlling circuit 3E, there is judged a relationship most suitable for realizing the desired relationship to be set corresponding to the main signal light from among the relationships corresponding to the changes in characteristics of the monitoring optical device 3B, and the control parameter for the optical device 1 is controlled so as to be consistent with the value of control parameter at that time.

As mentioned above, according to the control apparatus 3' of the second embodiment, by providing the sweep circuit 3F in the controlling circuit 3E, the operation setting of the optical device 1 for main signal is controlled by the control parameter of which processed state is actually verified by using the monitoring optical device 3B. Thus, it becomes possible to ensure with higher accuracy desired characteristics of the optical device 1 immediately after the control start.

Next, there will be described a third embodiment of the present invention.

Figure 3:
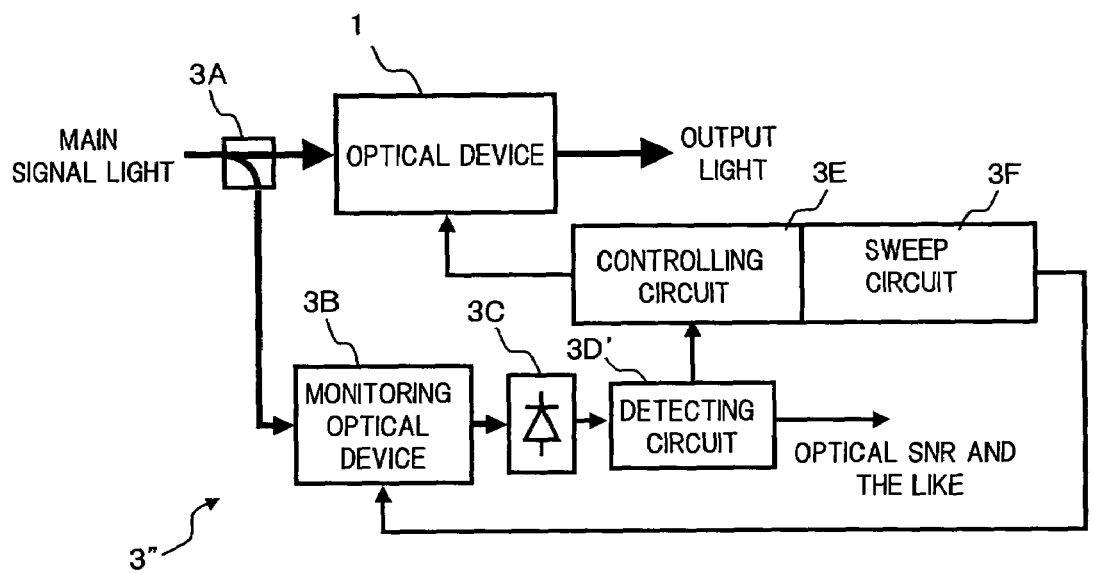
FIG. 3 is a block diagram showing a third embodiment of a control apparatus of an optical device according to the present invention.

FIG. 3 is a block diagram showing the third embodiment of a control apparatus of an optical device according to the present invention.

In FIG. 3, a control apparatus 3" of the third embodiment is constituted such that, for the control apparatus 3' of the above mentioned second embodiment, a detecting circuit 3D' is provided instead of the detecting circuit 3D. Other components except for the detecting circuit 3D' are the same as those in the second embodiment.

Figure 4:
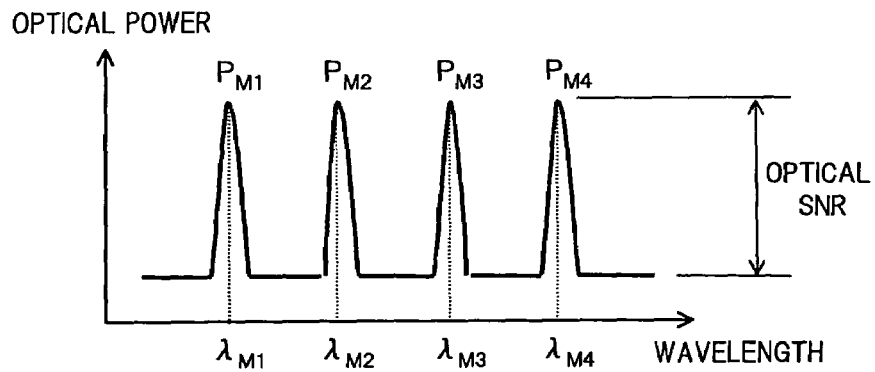
FIG. 4 is a diagram showing one example of monitor light in the third embodiment.

The detecting circuit 3D' detects the relationship between the monitor light processed by the monitoring optical device 3B and the wavelength or optical power of the main signal light, based on the electrical signal from the light receiver 3C, and also detects at least one of the wavelength, optical power and optical signal-to-noise ratio (optical SNR) of the main signal light by utilizing the detected relationship. Specifically, for example as shown in FIG. 4, in a case where the monitor light processed by the monitoring optical device 3B of which characteristics are changed in accordance with the control parameter swept within the required range, includes four signal components of different wavelengths, the detecting circuit 3D' detects relationships between peak wavelengths $\lambda_{M1}$-$\lambda_{M4}$, peak powers $P_{M1}$-$P_{M4}$, and the wavelengths, optical powers of respective optical signals included in the main signal light, respectively. Further, the detecting circuit 3D' obtains the wavelength and optical power of the signal light capable to be processed and output by the optical device 1 for main signal, and further, obtains the respective powers of the signal components and noise components of the optical signals corresponding to the respective wavelengths, to detect the optical SNR.

The relationships between the monitor light and the main signal light detected in this way are transmitted to the controlling circuit 3E as in the second embodiment, and the respective values of the wavelength, optical power and optical SNR of the main signal light are output to the outside as information indicating optical characteristics of the signal light processed by the optical device 1.

In this way, according to the control apparatus 3" of the third embodiment, the detecting circuit 3D' obtains the wavelength, optical power, optical SNR of the main signal light. Thus, it becomes possible to utilize the monitoring optical device 3B separately provided for controlling the characteristics of the optical device 1 for main signal as means having a function equivalent to an optical spectrum analyzer, so as to estimate the output characteristics of the optical device 1.

Next, there will be described a fourth embodiment of the present invention.

Figure 5:
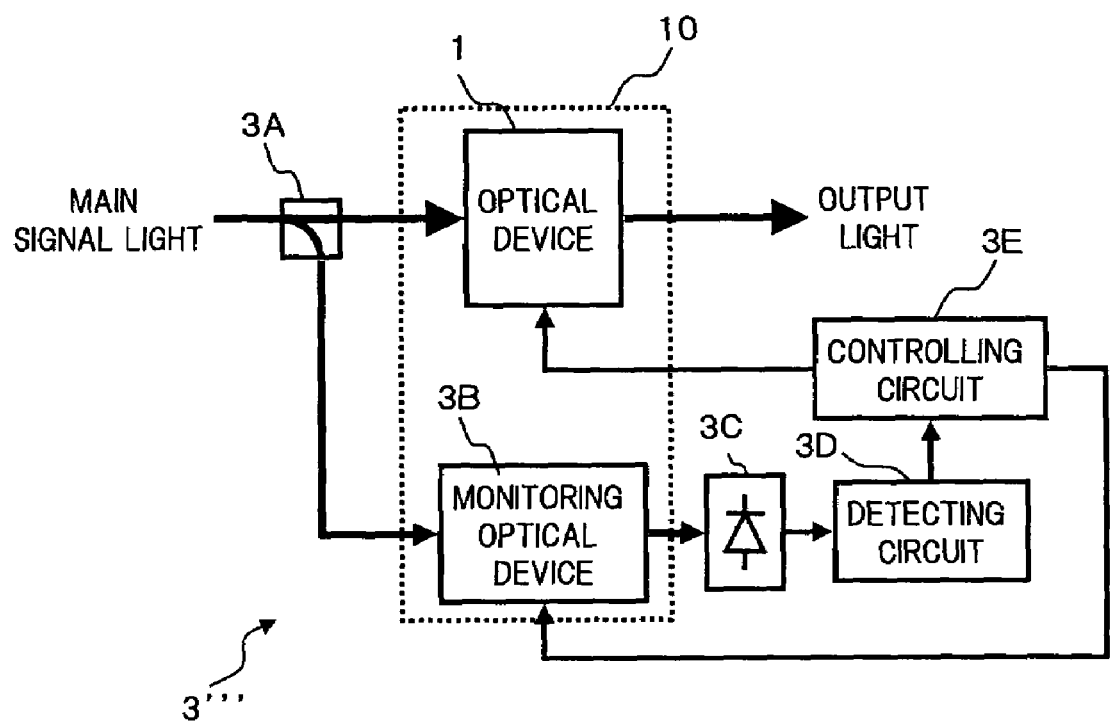
FIG. 5 is a block diagram showing a fourth embodiment of a control apparatus of an optical device according to the present invention.

FIG. 5 is a block diagram showing the fourth embodiment of a control apparatus of an optical device according to the present invention.

In FIG. 5, a control apparatus 3''' of the fourth embodiment is constituted such that, for the constitution of the above mentioned first embodiment, the optical device 1 for main signal and the monitoring optical device 3B are formed on the same substrate 10. Other components except for this are the same as those in the first embodiment.

In this manner, by integrating the optical device 1 for main signal with the monitoring optical device 3B onto the same substrate 10, the characteristics of the respective optical devices operating in accordance with the same control parameter are further unified. Thus, it becomes possible to control with higher accuracy the characteristics of the optical device 1.

Here, specific embodiments applied with the above fourth embodiment will be described in detail. In the following, an optical wavelength variable filter of band rejection type embodied by cascade loop connecting three optical wavelength filters on the same substrate is supposed as the optical device 1 for main signal, to consider, as one example, a control apparatus for controlling wavelength characteristics of the optical wavelength variable filter.

Figure 6:
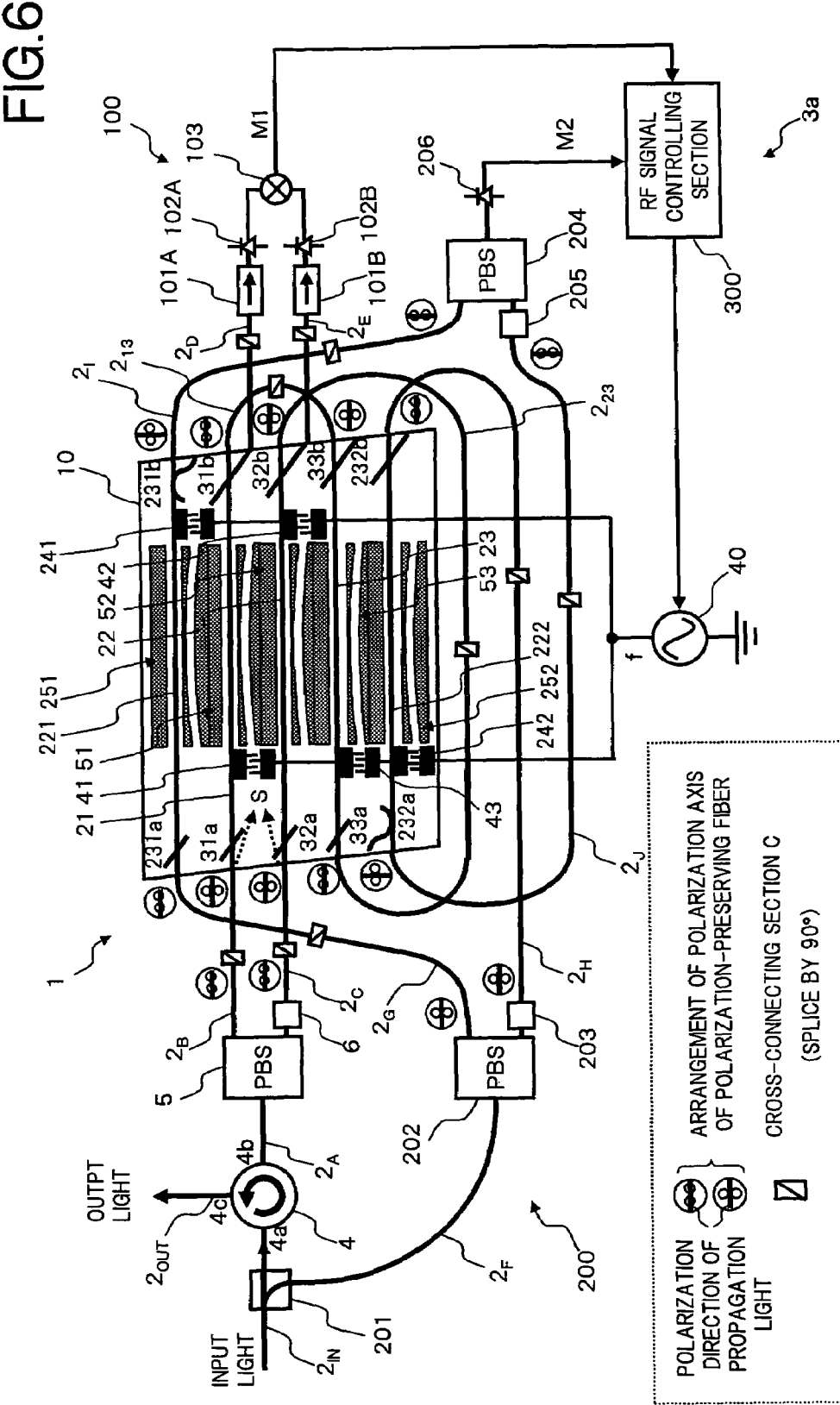
FIG. 6 is a block diagram showing a more specific embodiment of a control apparatus of an optical device according to the present invention.

FIG. 6 is a plan view showing the constitution of the optical wavelength variable filter and control apparatus thereof according to the above embodiment.

In the optical wavelength variable filter 1 shown in FIG. 6, for example, three acousto-optic tunable filters (AOTF) formed on the same substrate 10 are connected to one another by means of connecting optical paths $2_{13}$ and $2_{23}$. Optical input and output portions of the connected AOTFs on the same substrate 10 are connected to an input optical path $2_{IN}$ and an output optical path $2_{OUT}$ by using an optical circulator 4, a polarization beam splitter (PBS) 5, a polarization rotating section 6 and connecting optical paths $2_A$, $2_B$, $2_C$, so that the three AOTFs on the substrate 10 are cascade connected in a loop.

A control apparatus 3a to be applied to the above optical wavelength variable filter 1, for example, comprises a first monitoring section 100, a second monitoring section 200 and an RF signal controlling section 300. The first monitoring section 100 monitors a dropped light blocked from passing through by a required AOTF, so as to perform a tracking control of the selected wavelengths in the respective AOTFs cascade loop connected on the substrate 10. The second monitoring section 200 has a constitution equivalent to the optical coupler 3A, monitoring optical device 3B and light receiver 3C in the above fourth embodiment. At the starting, the alteration of setting or the like of the optical wavelength variable filter 1, in order to previously detect a control value of the AOTFs cascade loop connected on the substrate 10, the second monitoring section 200 monitors the lights passed through monitoring AOTFs on the substrate 10, that operates in accordance with the parameter same as for the AOTFs. The RF signal controlling section 300 controls RF signals to be given to the respective AOTFs based on the monitoring results of the first and second monitoring sections 100 and 200, to control the operation states of AOTFs. The RF signal controlling section 300 has a function equivalent to the detecting circuit 3D, controlling circuit 3E and sweep circuit 3F in the above fourth embodiment.

The substrate 10 is constituted such that five optical waveguides 21, 22, 23, 221 and 222 substantially parallel with one another are formed on a substrate material made of, for example, $LiNbO_3$. The optical waveguides 21 to 23 are used for the main signal, and the optical waveguides 221 and 222 are used for the second monitoring section 200. The respective optical waveguides 21, 22, 23, and 221, 222 are provided with polarization beam splitters (PBS) 31a, 31b, 32a, 32b, 33a, 33b, and 231a, 231b, 232a, 232b, respectively, at both end portions thereof. Also, the substrate 10 is formed with interdigital transducers (IDT) 41, 42, 43, and 241, 242, and SAW guides 51, 52, 53, and 251, 252, corresponding to the optical waveguides 21, 22, 23, and 221, 222, respectively.

As the respective PBSs 31a, 31b, 32a, 32b, 33a and 33b for main signal, it is possible to use, for example, PBSs of crossing waveguide type and the like. Here, input and output ports of the PBSs positioned at the crossing sides of the crossing waveguides are connected to the optical waveguides, respectively, so that the respective PBSs are constituted to be of TE mode transmission type. Further, as the respective PBSs 231a, 231b, 232a and 232b for the second monitoring section 200, it is possible to use, for example, PBSs of crossing waveguide type and the like. However, herein, input and output ports of the PBSs 231a and 232b positioned at the crossing sides of the crossing waveguides are connected to the optical waveguides, respectively, so that the PBSs 231a and 232b are constituted to be of TE mode transmission type, while input and output ports of the PBSs 231b and 232a positioned at the bar sides of the crossing waveguides are connected to the optical waveguides, respectively, so that the PBSs 231b and 232a are constituted to be of TM mode transmission type.

The respective IDTs 41 to 43, 241 and 242 are applied commonly with a signal of required frequency f generated by an RF signal generating circuit 40, to generate surface acoustic waves (SAW), respectively. Note, as will be described later, positions of the respective IDTs 41 to 43, 241 and 242 are preferably set such that relationships between the propagation directions of SAWs and the propagation directions of lights within the corresponding optical waveguides are those taking into account of influences of selected wavelength Doppler shift and the like.

The SAW guides 51 to 53, 251 and 252 are those for propagating respective SAWs generated at the IDTs 41 to 43, 241 and 242 through the optical waveguides 21 to 23, 221 and 222, respectively. Here, a case is shown where, for example, SAW guides of directional coupling type formed in required shape by Ti diffusion are used, as the SAW guides 51 to 53, 251 and 252.

In the AOTF using the SAW guides of directional coupling type, SAWs generated at the IDTs are directionally coupled by the SAW guides of required shape, so that SAWs most strongly interfere the light being propagated through the optical waveguide in the vicinity of the center of mode conversion area. Thus, it is possible to achieve the suppression of side lobe level in the filter characteristics of AOTF. Note, in the SAW guides shown in FIG. 6, curving shapes are adopted in order to directionally couple SAWs in accordance with a further desired function. In this way, it becomes possible to suppress further effectively the side lobe level.

Here, the case is shown where the AOTF using the SAW guides of directional coupling type is used. However, the present invention is not limited thereto, and it is possible to use AOTF and the like formed with SAW guides of thin film type on the optical waveguides. Further, for the AOTF using the SAW guides of thin film type, the arrangement may be such that the longitudinal direction of each SAW guide is inclined by a required amount to the axial direction of the optical waveguide so that the propagation axis of SAW and the optical axis cross each other at an inclined angle. By adopting such an arrangement, the intensity of surface acoustic wave sensed by the light is weighted in the longitudinal direction. Thus, it becomes possible to achieve the suppression of side lobe level.

The optical circulator 4 is a typical optical component that includes at least three ports 4a, 4b and 4c, and transmits the light only in a direction from the port 4a to port 4b, from the port 4b to port 4c, and from the port 4c to port 4a. This optical circulator 4 is connected with the input optical path $2_{IN}$, the connecting optical path $2_A$ to be connected to a PBS 5, and the output optical path $2_{OUT}$, at the port 4a, port 4b, and port 4c, respectively.

The PBS 5 splits an input light sent from the port 4b of the optical circulator 4 via the connecting optical path $2_A$ into two polarization lights with polarization planes thereof being orthogonal to each other, to output one of the two polarization lights to one end of the connecting optical path $2_B$, while outputting the other polarization light to one end of the connecting optical path $2_C$. The other end of the connecting optical path $2_B$ is connected to the PBS 31a positioned on the optical waveguide 21 of the substrate 10, and the other end of the connecting optical path $2_C$ is connected to the PBS 32a positioned on the optical waveguide 22 of the substrate 10. Also, herein, a polarization rotating section 6 is inserted onto the connecting optical path $2_C$. The polarization rotating section 6 has a function for rotating the polarization plane of the other polarization light split by the PBS 5 by 90 degrees.

The PBS 31b positioned on the optical waveguide 21 of the substrate 10 is connected to the PBS 33b positioned on the optical waveguide 23 by the connecting optical path $2_{13}$. Further, the PBS 32b positioned on the optical waveguide 22 of the substrate 10 is connected to the PBS 33a positioned on the end portion of the optical waveguide 23 by the connecting optical path $2_{23}$. Thus, the three AOTFs for main signal on the substrate 10 are cascade connected in a loop between the input optical path $2_{IN}$ and the output optical path $2_{OUT}$.

Figure 7:
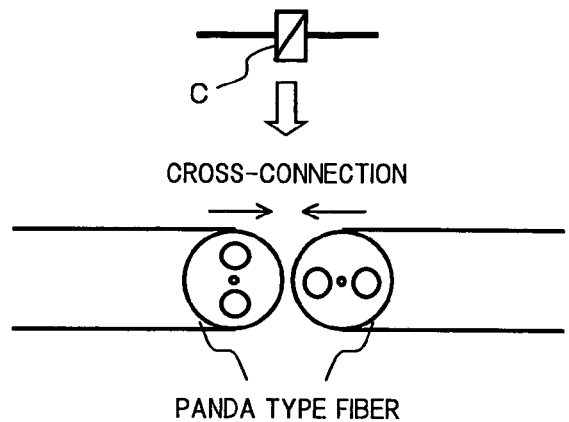
FIG. 7 is a diagram for explaining the cross-connection of connecting optical paths in an optical wavelength variable filter of FIG. 6.

The connecting optical paths $2_B$, $2_C$, $2_{13}$ and $2_{23}$ are polarization-preserving fibers, and here, for example, PANDA type fibers are used. However, the structure of polarization-preserving fiber is not limited to the PANDA type fiber, and it is possible to adopt a known structured fiber. Further, each of the connecting optical paths $2_B$, $2_C$, $2_{13}$ and $2_{23}$ includes a cross-connecting section C spliced by rotating the polarization axis substantially by 90 degrees as shown in FIG. 7, and suppresses an influence due to the deviation of polarization axis of when connecting an optical device having polarization dependence by the polarization-preserving fiber, as described later.

Moreover, the first monitoring section 100 connected to the substrate 10 comprises an optical isolator 101A and a light receiver 102A for monitoring a dropped light from the lights sequentially passing in one direction through the respective AOTFs cascade loop connected to one another, an optical isolator 101B and a light receiver 102B for monitoring a dropped light from the lights sequentially passing in the other direction through the respective AOTFs cascade loop connected to one another, and a circuit 103 that adds up output signals photo-electrically converted by the light receivers 102A and 102B, to output a monitor signal M1.

Here, an input port of the optical isolator 101A is connected to a TM mode output port of the PBS 31b on the substrate 10 via a connecting optical path $2_D$, while an input port of the optical isolator 101B is connected to a TM mode output port of the PBS 32b on the substrate 10 via a connecting optical path $2_E$. As described later, it is desirable to set a position for monitoring the dropped signal for the light in each direction to an AOTF stage wherein the selected wavelength (dropped wavelength) is positioned at the center of blocking band, considering an influence of dithering to be given to the RF signal.

Further, the second monitoring section 200 connected to the substrate 10 includes an optical coupler 201 on the input optical path $2_{IN}$ that branches a part of the input light by a required branching ratio (for example, 10:1 and the like), a PBS 202 that polarization splits the branched light from the optical coupler 201 to send the split lights to the respective monitoring AOTFs on the substrate 10, a PBS 204 that multiplexes the polarization lights passed through the monitoring AOTFs on the substrate 10, and a light receiver 206 that converts the monitor light multiplexed by the PBS 204 into an electrical signal, to thereby output a monitor signal M2.

The PBS 202 splits the branched light sent from the optical coupler 201 via a connecting optical path $2_F$ into two polarization lights with polarization planes thereof being orthogonal to each other, and outputs one of the polarization lights to one end of a connecting optical path $2_G$, while outputting the other polarization light to one end of a connecting optical path $2_H$. The other end of the connecting optical path $2_G$ is connected to a PBS 231a positioned on the optical waveguide 221 of the substrate 10, and the other end of the connecting optical path $2_H$ is connected to a PBS 232b positioned on the optical waveguide 222 of the substrate 10. Also, herein, a polarization rotating section 203 is inserted onto the connecting optical path $2_H$. The polarization rotating section 203 has a function for rotating the polarization plane of the other polarization light split by the PBS 202 by 90 degrees.

The PBS 204 multiplexes the polarization lights with polarization planes thereof being orthogonal to each other, passed through the monitoring AOTFs on the substrate 10 to be sent via respective connecting optical paths $2_I$ and $2_J$, to output the multiplexed light to the light receiver 206. Specifically, a TM mode light output from a PBS 231b on the optical waveguide 221 of the substrate 10 is input to the PBS 204 through the connecting optical path $2_I$, and at the same time, a TM mode light output from a PBS 232a on the optical waveguide 222 of the substrate 10 passes through the connecting optical path $2_J$ and is rotated with polarization plane thereof by 90 degrees at a polarization rotating section 205, to be input to the PBS 204.

For the respective connecting optical paths $2_D$, $2_E$, $2_G$, $2_H$, $2_I$ and $2_J$ used in the first and second monitoring sections 100 and 200, for example, optical paths of polarization-preserving type such as PANDA type fiber are used, and each optical path includes, in the vicinity of the center in the longitudinal direction, the cross-connecting section C of the same structure as in the above mentioned FIG. 7.

Figure 8:
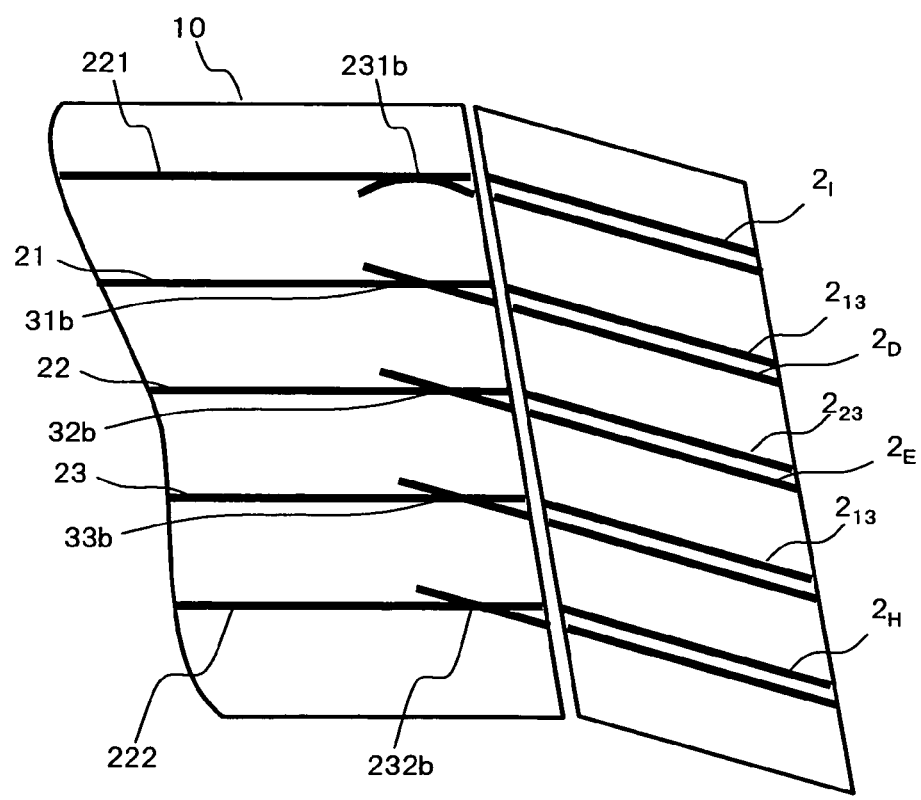
FIG. 8 is a diagram showing one example of the end face shape of a substrate in the optical wavelength variable filter of FIG. 6.
Figure 9:
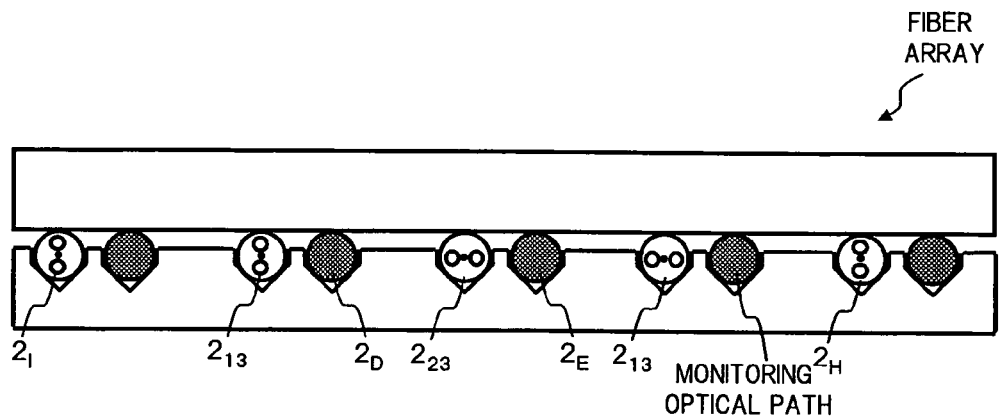
FIG. 9 is a diagram showing one example of fiber array structure connected to the substrate end face in the optical wavelength variable filter of FIG. 6.

It is preferable that two end faces opposite to each other of the substrate 10, to which the respective optical paths for main signal and for monitoring are connected, are inclined by required angles so as to reduce an influence of reflected light at the faces connected with the respective optical paths, for example, as shown in FIG. 8. Also, it is preferable that the optical fibers to be connected to each of the substrate end faces are structured in a fiber array, for example, as shown in FIG. 9. Note, the optical fibers provided in parallel to the respective connecting optical paths $2_{13}$ and $2_{23}$ in FIG. 9, are for extracting the dropped lights and the like to be blocked from passing through by the AOTFs at respective stages. An arrangement for the polarization axes of the polarization-preserving fibers within the fiber array is desirable to be set, considering the symmetry with a fiber array connected to the substrate end face on the opposite side, so that the kinds of the both side fiber arrays are the same.

In the optical wavelength variable filter 1 having the above mentioned constitution, the input light propagated through the input optical path $2_{IN}$ is sent to the PBS 5 via the optical circulator 4 and the connecting optical path $2_A$, and split into two polarization lights orthogonal to each other, to be output to the connecting optical paths $2_B$ and $2_C$, respectively. The polarization light output to the connecting optical path $2_C$ is rotated with polarization plane thereof by 90 degrees by the polarization rotating section 6, to be aligned with the polarization direction of the polarization light output to the connecting optical path $2_B$. Then, the respective polarization lights propagated through the connecting optical paths $2_B$ and $2_C$ are given to the PBSs 31a and 32a on the substrate 10, respectively, as the TE mode lights. Note, in FIG. 6, the polarization directions of propagated lights are indicated together with the cross section of arrangement of polarization axes of the PANDA type fibers, so that the polarization directions of propagated lights at the respective portions on the optical paths cascade loop connected can be clearly understood.

The TE mode light given to the PBS 31a passes therethrough and is propagated through the optical waveguide 21 toward the PBS 31b. At this time, SAW generated as a result that the RF signal of frequency f from the RF signal generating circuit 40 is applied to the IDT 41, is guided along the optical waveguide 21 by the SAW guide 51, to be propagated in the same direction (forward direction) as the propagated light within the optical waveguide 21. Due to the acousto-optic effect by this SAW, only the light of wavelength corresponding to the frequency of SAW (selected wavelength) out of the TE mode light being propagated within the optical waveguide 21, is mode converted into a TM mode light. Then, the lights of respective modes reach the PBS 31b, the TE mode light of wavelengths different from the selected wavelength (non-selected wavelengths), that has not been mode converted, passes through the PBS 31b to be output to the connecting optical path $2_{13}$, while the mode converted TM mode light of selected wavelength is branched by the PBS 31b as a dropped light, to be sent to the optical isolator 101A of the first monitoring section 100.

The TE mode light output to the connecting optical path 213 passes through the PANDA type fiber that is spliced by 90 degrees in the vicinity of the center in the longitudinal direction, to be sent to the PBS 33b on the optical waveguide 23. At this time, a periodic wavelength dependence loss or polarization mode dispersion (PMD) due to inter-polarization-mode interference caused in the PANDA type fiber, and a polarization dependence loss (PDL) caused in the PBS on the substrate 10 and the like are offset in front of and behind the 90 degree splice point, to be suppressed.

Here, there will be described the inter-polarization-mode interference caused within the optical paths of polarization-preserving type.

In a case where a plurality of optical devices each having polarization dependence are connected by polarization-preserving fiber or the like, it is an ideal to perform the connection by completely coinciding the polarization axis (Fast axis, Slow axis) directions of the polarization-preserving fiber with the axis direction of polarization light to be input/output to/from the optical devices. However, in the actual connection of the polarization-preserving fiber with the optical devices, it is difficult to completely coincide the axis directions with each other and thus, certain axis deviation cannot be avoided.

Figure 10:
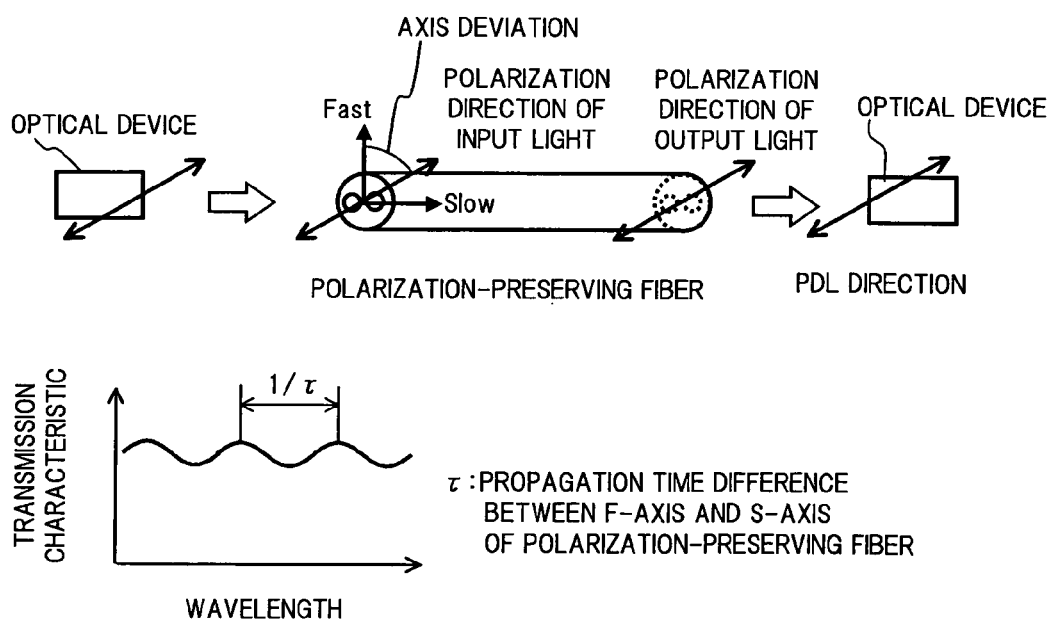
FIG. 10 is a diagram for explaining inter-polarization-mode interference of a polarization-preserving fiber.

If the axis deviation as mentioned above is caused, as shown in FIG. 10, the inter-polarization-mode interference of the polarization-preserving fiber is caused, resulted in the periodic wavelength dependence loss in the transmission characteristics of optical devices. The period of this periodic wavelength dependence loss becomes $1/\tau$, if a difference between the propagation times of Fast axis and Slow axis of the polarization-preserving fiber is $\tau$. Such a periodic wavelength dependence loss due to the inter-polarization-mode interference of the polarization-preserving fiber causes a change in level of transmission light in an optical filter of band rejection type according to the wavelength, to lead characteristic deterioration.

Therefore, in the present optical wavelength variable filter 1, by splicing the PANDA type fiber by rotating the polarization axis thereof by 90 degrees in the vicinity of the center of the connecting optical path in the longitudinal direction, the respective directions of Fast axis and Slow axis are switched in front of and behind the splicing point, so that the polarization light to be propagated through the connecting optical path is propagated through the respective polarization axes for substantially equal distances. Thus, the influence by the above mentioned periodic wavelength dependence loss, PMD or PDL shall be offset.

The TE mode light sent to the PBS 33b on the substrate 10 passes therethrough and is propagated within the optical waveguide 23 toward the PBS 33a. At this time, SAW generated at the IDT 43 and guided by the SAW guide 53 is propagated in a reverse direction to the propagated light within the optical waveguide 23. Due to the acousto-optic effect by this SAW, only the light corresponding to the selected wavelength out of the TE mode light being propagated through the optical waveguide 23 is mode converted into a TM mode light. Then, when the lights of respective modes reach the PBS 33a, the TE mode light of non-selected wavelengths, that has not been mode converted, passes through the PBS 33a to be output to the connecting optical path $2_{23}$, while the mode converted TM mode light of selected wavelength is branched by the PBS 33a.

The TE mode light output to the connecting optical path $2_{23}$ is sent to the PBS 32b on the optical waveguide 22 while the periodic wavelength dependence loss and the like thereof being suppressed by passing the PANDA type fiber having the cross-connecting section C, in the same manner as when passed through the connecting optical path $2_{13}$.

The TE mode light sent to the PBS 32b passes therethrough and is propagated within the optical waveguide 22 toward the PBS 32a. At this time, SAW generated at the IDT 42 and guided by the SAW guide 52 is propagated in a forward direction to the propagated light within the optical waveguide 22. Due to the acousto-optic effect by this SAW, only the light corresponding to the selected wavelength out of the TE mode light being propagated through the optical waveguide 22 is mode converted into a TM mode light. The TE mode light of non-selected wavelengths that has not been mode converted, passes through the PBS 32a to be output to the connecting optical path $2_C$, while the mode converted TM mode light of selected wavelength is branched by the PBS 32a. The TE mode light output to the connecting optical path $2_C$ is rotated with the polarization plane thereof by 90 degrees by the polarization rotating section 6 on the connecting optical path $2_C$ and then returned to the PBS 5.

The respective selected wavelengths to be mode converted at the respective optical waveguides 21 to 23 are slightly different from one another, due to the selected wavelength Doppler shift to be described in the following, or inherent wavelength deviation caused by variations in manufacturing process of the substrate 10, even in a constitution where the RF signal is applied commonly to the IDTs 41 to 43.

Here, the selected wavelength Doppler shift will be described.

Figure 11:
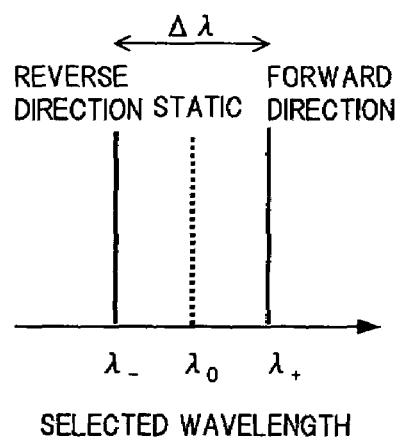
FIG. 11 is a diagram for explaining the selected wavelength Doppler shift in AOTF.

The selected wavelength Doppler shift is a phenomenon in which the wavelengths of the light to be polarization mode converted become different from one another due to the acousto-optic effect, depending on a relationship between the propagation direction of light within the optical waveguide and that of SAW transmitted along that optical waveguide. This phenomenon is caused by the same theory as that of typically known Doppler shift, and in the above case, it can be considered that the wavelength (frequency) of SAW viewed from the light is changed. Accordingly, for example, as shown in FIG. 11, if the propagation direction of light is the same forward direction as the propagation direction of SAW, the wavelength of SAW sensed by the light becomes longer. On the contrary, if the propagation direction of light is the reverse direction to the propagation direction of SAW, the wavelength of SAW sensed by the light becomes shorter. The selected wavelength λ in a case of influenced by such a Doppler shift, can be represented by the following equation (1);

$$\lambda = \frac{\lambda_0}{1 - v/c} \quad (1)$$

wherein $\lambda_0$ is the selected wavelength in a case where SAW is static, v is a speed of SAW, and c is an average speed of light in the optical waveguide.

Accordingly, a selected wavelength difference Δλ caused by whether the propagation directions of the light and SAW are forward directions or reverse directions can be represented by the following equation (2).

$$\Delta\lambda = 2 \cdot \lambda_0 \cdot \frac{v/c}{1 - (v/c)^2} \quad (2)$$

In the optical wavelength variable filter 1 of rejection type with three AOTFs cascade loop connected as shown in FIG. 6, the selected wavelengths in the AOTFs at respective stages are different from one another due to the inherent wavelength deviation caused by variations in manufacturing process of the substrate 10 in addition to the selected wavelength difference Δλ due to the above mentioned selected wavelength Doppler shift. The wavelength deviation caused by variations in manufacturing process, for example, is inherently caused in individual substrates due to manufacturing errors in width of the optical waveguides 21 to 23 at respective stages.

Figure 12A:
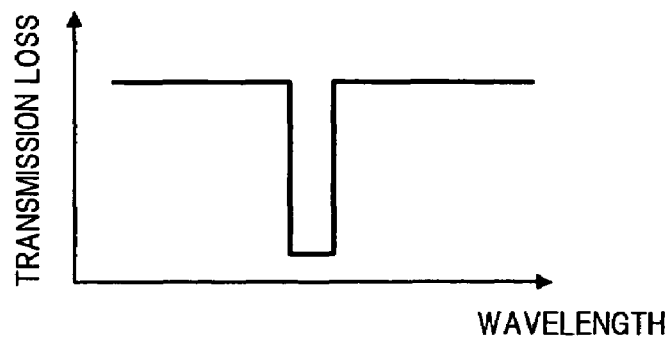
FIG. 12A shows ideal filter characteristics.
Figure 12B:
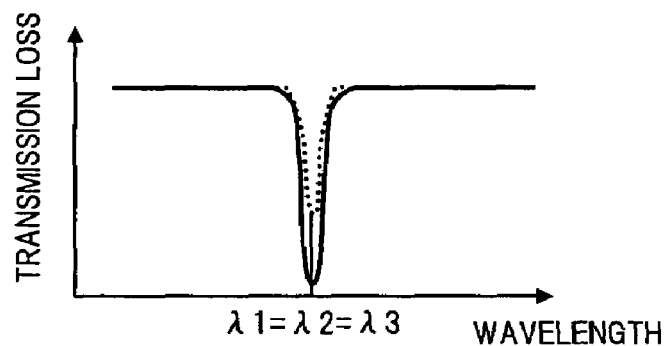
FIG. 12B shows filter characteristics of when the selected wavelengths are coincident with one another in a multi-staged structure.

For the wavelength characteristics of the rejection type optical filter, for example, as shown in the conceptual diagram of FIG. 12A, it is an ideal to have a filter characteristic that is changed in rectangular, namely, a change in transmissivity from the passing band to the blocking band is steep and also the blocking band has a required width. In the multi-staged structure of AOTFs, basically, the filter characteristic having an excellent extinction ratio can be obtained, as the number of stages is increased. At this time, if the selected wavelengths at the respective stages are all coincident, as shown in the conceptual diagram of FIG. 12B, since the transmissivity becomes minimum at one point, the width of blocking band becomes narrower. For the blocking band of the rejection type optical filter, a required width needs to be ensured, considering the conditions of, for example, the wavelength width of optical signal corresponding to the spectrum width of light source such as laser, errors in setting or controlling of AOTFs, or the unstable wavelength of light source. Therefore, according to the filter characteristics as shown in FIG. 12B, it becomes impossible to block the passing of optical signal of desired wavelength even in a case a slight variation is caused in the setting of the optical signal wavelength or the setting of filter.

Figure 12C:
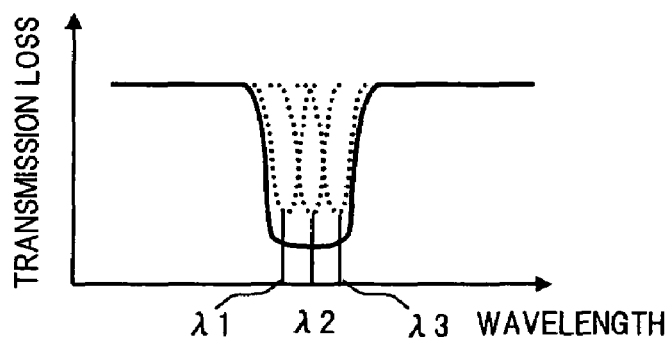
FIG. 12C shows filter characteristics of when the selected wavelengths are different from one another.

Therefore, in the rejection type optical filter shown in FIG. 6, the wavelength deviation inherent to the substrate caused by variations in manufacturing process is considered and also the selected wavelength difference Δλ due to the selected wavelength Doppler shift is utilized, to ensure a required width of blocking band by slightly deviating the selected wavelengths in the AOTFs at respective stages with one another as shown in FIG. 12C.

Figures 13A, 13B, 13C:
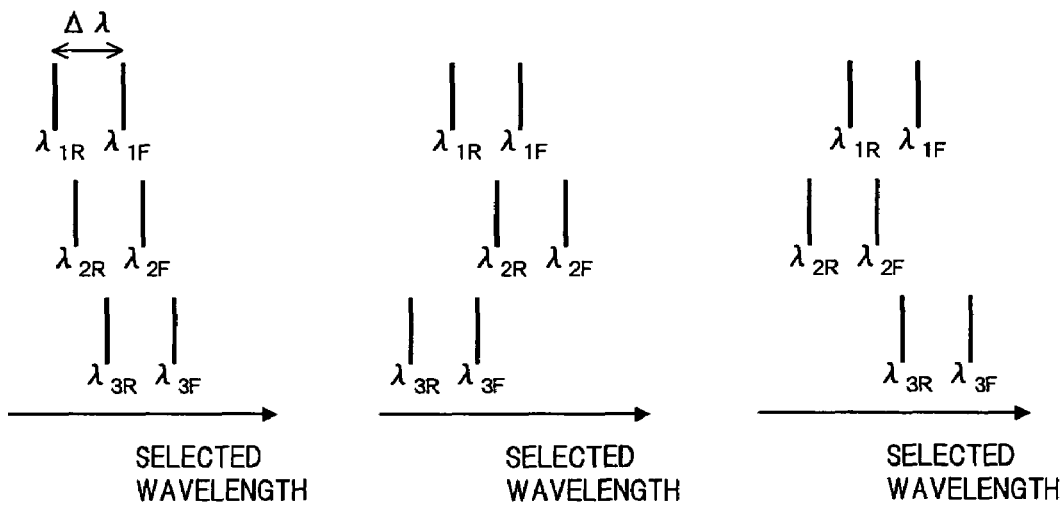
FIG. 13A to FIG. 13C are exemplary diagrams of wavelength deviation patterns.
Figure 13D:
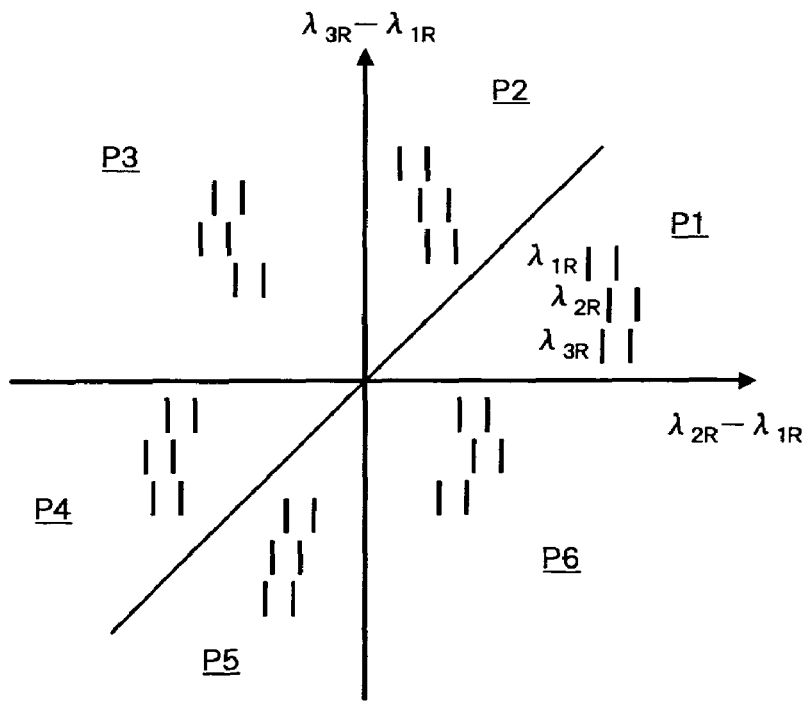
FIG. 13D is a diagram showing a typical wavelength deviation pattern.

Specifically, when the selected wavelengths corresponding to the respective optical waveguides 21, 22, 23 when SAWs of the same frequency f are given in the forward directions to the propagated lights are made $\lambda_{1F}$, $\lambda_{2F}$ and $\lambda_{3F}$, while the selected wavelengths corresponding to the respective optical waveguides 21, 22, 23 when SAWs of the same frequency f are given in the reverse directions to the propagated lights are made $\lambda_{1R}$, $\lambda_{2R}$ and $\lambda_{3R}$, there occurs various patterns in the wavelength deviation inherent to the substrate caused by variations in manufacturing process, as shown in FIG. 13A to FIG. 13C, for example. Such wavelength deviation patterns of the three staged AOTFs can be classified into six patterns P1 to P6 as shown in FIG. 13D when the values of $\lambda_{2R}-\lambda_{1R}$ are put on the horizontal axis and the values of $\lambda_{3R}-\lambda_{1R}$ are put on the transverse axis with the selected wavelength $\lambda_{1R}$ as the reference.

In order to realize the selected wavelengths that are slightly deviated among the respective stages as shown in FIG. 12C, it is required to determine optimum combinations of the wavelength deviation of the patterns P1 to P6, with the wavelength difference due to the selected wavelength Doppler shift. When determining the optimum combinations, it is desired to consider the condition that the connection relationship in which such kinds of fiber arrays as explained in FIG. 9 can be made same on the both ends of the substrate 10, and the connection relationship of the input and output for suppressing an influence by stray light as described in the following, are satisfied at the same time.

In a case where a plurality of optical devices integrated on the same substrate are connected to be used, most of the input light from a substrate input section passes through the optical devices, however, as shown by an arrow in dotted line in FIG. 6, a part of the input light is emitted into the substrate to be propagated as the stray light S. This stray light S is likely to be coupled to an output section bypassing the optical devices, thereby causing deterioration of extinction ratio and the like.

In order to effectively suppress such a leakage phenomenon of the stray light S from the input side to the output side, for example, in a case where a plurality of optical devices on the same substrate are cascade connected to be used, such a connection relationship is preferable that both ends of optical path passing through all of optical devices are positioned on the same end face of the substrate. By realizing such a connection relationship, the stray light S from the input side is hardly to be coupled to the light being propagated within the optical path on the output side.

Figure 14:
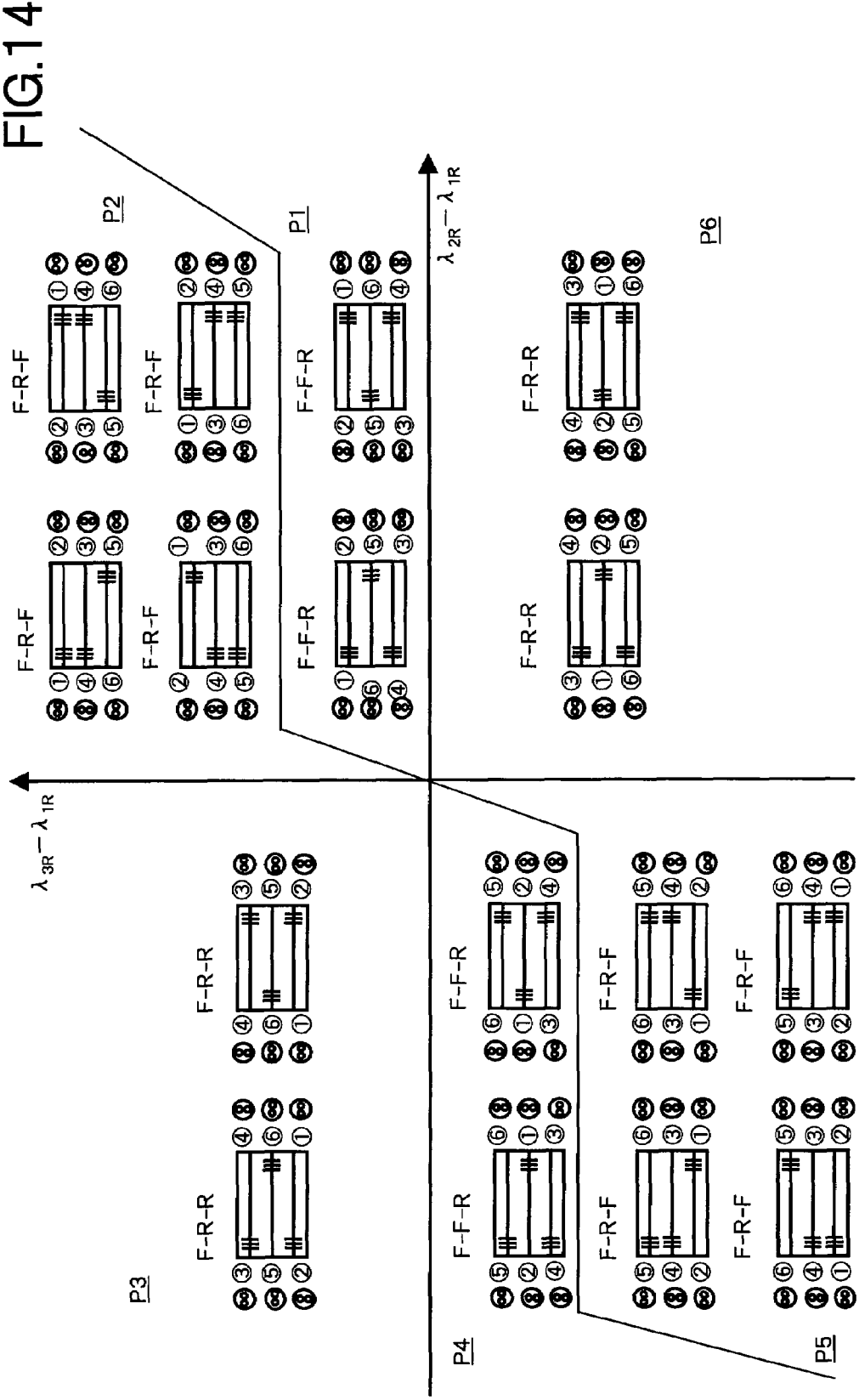
FIG. 14 is a schematic view arranging optimum connection relationships in view of an influence of selected wavelength Doppler shift and the like, according to the wavelength deviation patterns in FIG. 13.

The optimum combinations satisfying all the conditions of the above mentioned selected wavelength Doppler shift and the like, including the connection relationship of input and output for suppressing the above influence by the stray light, can be determined corresponding to the respective patterns P1 to P6 in FIG. 13D, and the combination results are shown in FIG. 14.

In FIG. 14, the numerals ① to ⑥ indicated at both ends of the substrate show the connecting orders of AOTFs at respective stages. Further, characters such as "F-F-R" (forward-forward-reverse) indicated at the upper part of the substrate show the propagation direction of SAW relative to the light being propagated through the optical waveguide positioned at the upper stage of the substrate in the figure, the propagation direction of SAW relative to the light being propagated through the optical waveguide positioned at the middle stage of the substrate, and the propagation direction of SAW relative to the light being propagated through the optical waveguide positioned at the lower stage of the substrate, in this sequence. Further, arrangements of respective polarization axes of when the respective PANDA type fibers connected to the both ends of the substrate are made fiber arrays of same kind, are shown on the right and left sides of the substrate.

The constitution of the optical wavelength variable filter shown in FIG. 6 specifically illustrates the connection relationship corresponding to the pattern P1 in FIG. 14. For the selected wavelength Doppler shift, the arrangement of the IDTs 41, 43 and 42 at the respective stages are set so that, to the light given via the connecting optical path $2_B$, the propagation direction of SAW in the AOTF of the first stage corresponding to the optical waveguide 21 is the forward direction, the propagation direction of SAW in the AOTF of the second stage corresponding to the optical waveguide 23 is the reverse direction, and the propagation direction of SAW in the AOTF of the third stage corresponding to the optical waveguide 22 is the forward direction. In the AOTFs at respective stages, since the RF signal of the same frequency is given to the IDTs, the wavelength difference due to the selected wavelength Doppler shift corresponding to the above equation (2) is caused between the selected wavelengths at the first and third stages, and the selected wavelength at the second stage. Thus, by combining the wavelength difference with the inherent wavelength deviation of the pattern P1, it becomes possible to realize the filter characteristic as shown in FIG. 12C.

In the optical wavelength variable filter 1, the TE mode light given from the PBS 5 to the PBS 32a of the substrate 10 via the connecting optical path $2_C$ and the polarization rotating section 6 passes through the AOTFs at respective stages sequentially, in reverse to the TE mode light given to the PBS 31a of the substrate 10 via the connecting optical path $2_B$, namely, passes sequentially through the optical waveguide 22, PBS 32a, connecting optical path $2_{23}$, PBS 33a, optical waveguide 23, PBS 33b, connecting optical path $2_{13}$, PBS 31b, optical waveguide 21 and PBS 31a, to be output to the connecting optical path $2_B$, and is returned to the PBS 5 under the polarization state just as is without polarization plane thereof rotated. In this reverse propagation of the polarization light, the mode converted TM mode light corresponding to the selected wavelength when being propagated through the optical waveguide 22, is branched by the PBS 32b as the dropped light, to be sent to the optical isolator 101B of the first monitoring section 100.

The respective polarization lights with polarization planes thereof being orthogonal to each other, returned to the PBS 5 via the connecting optical paths $2_B$ and $2_C$, are multiplexed by the PBS 5 and thereafter sent to the optical circulator 4 via the connecting optical path $2_A$, to be output to the output optical path $2_{OUT}$ after passing from the port 4b to the port 4c.

As mentioned above, when the polarization lights from the connecting optical paths $2_B$ and $2_C$ are propagated in bi-directions through the three staged AOTFs cascade loop connected on the substrate 10, the stray light S generated from each of the PBSs 31a and 32a at the one end of each of the optical waveguides 21 and 22 is propagated toward the end face on the opposite side to the optical input side of the substrate 10. However, since the connecting optical paths $2_B$ and $2_C$ are connected to the PBSs 31a and 32a positioned on the same end face of the substrate 10, respectively, the leakage phenomenon of the stray light from the input side to the output side is suppressed.

Moreover, in the optical wavelength variable filter 1, the dropped lights branched by the PBSs 31b and 32b, pass through the optical isolators 101A and 101B of the first monitoring section 100, to be converted into electrical signals at the light receivers 102A and 102B, respectively, and further are added up by the circuit 103 to be sent to the RF signal controlling section 300 as the monitor signal M1. In the RF signal controlling section 300, the peak wavelengths of the dropped lights are detected based on the monitor signal M1, and an amount of wavelength deviation to the previously set control value (selected wavelength) is obtained based on the monitoring result by the second monitoring section 200.

In the RF signal controlling section 300, as a method for detecting the peak wavelengths of the dropped lights based on the monitor signal M1, for example, a method to add dithering to the frequency f of RF signal to be applied commonly to the IDTs 41 to 43 at the respective stages, is suitable. Specifically, in a case where the frequency f of RF signal is set to, for example, 170 MHz, 4 kHz or the like is set as the frequency $\Delta f$ of the dithering, and the RF signal of which frequency fluctuates within a range of f±$\Delta f$ is applied to each of the IDTs 41 to 43. Thus, the selected wavelengths to be mode converted in the AOTFs at the respective stages fluctuate corresponding to the frequency $\Delta f$ of the dithering. Accordingly, the monitor signal M1 to be monitored by the first monitoring section 100 includes frequency components corresponding to the dithering. Thus, it becomes possible to detect the peak wavelengths of the actually dropped lights by utilizing the detected frequency components.

Here, in a case where the dithering is added to the frequency of RF signal, it is desirable that, for the blocking band as shown in FIG. 12C, the dropped light is taken out from the AOTF stage of which selected wavelength is positioned at the center of the blocking band, to monitor the dropped light by the first monitoring section 100. This is a useful setting for realizing the stable peak wavelength detection, by avoiding such a situation where, for example, if the dropped light from the AOTF stage of which selected wavelength is positioned at the end portion of the blocking band is monitored, the wavelength of the dropped light fluctuating by the dithering reaches the wavelength region where the transmissivity is steeply changed, so that the level of dropped light to be monitored by the first monitoring section 100 is largely changed, thereby resulting in a possibility that the peak wavelength of dropped light cannot be accurately detected.

Figure 15:
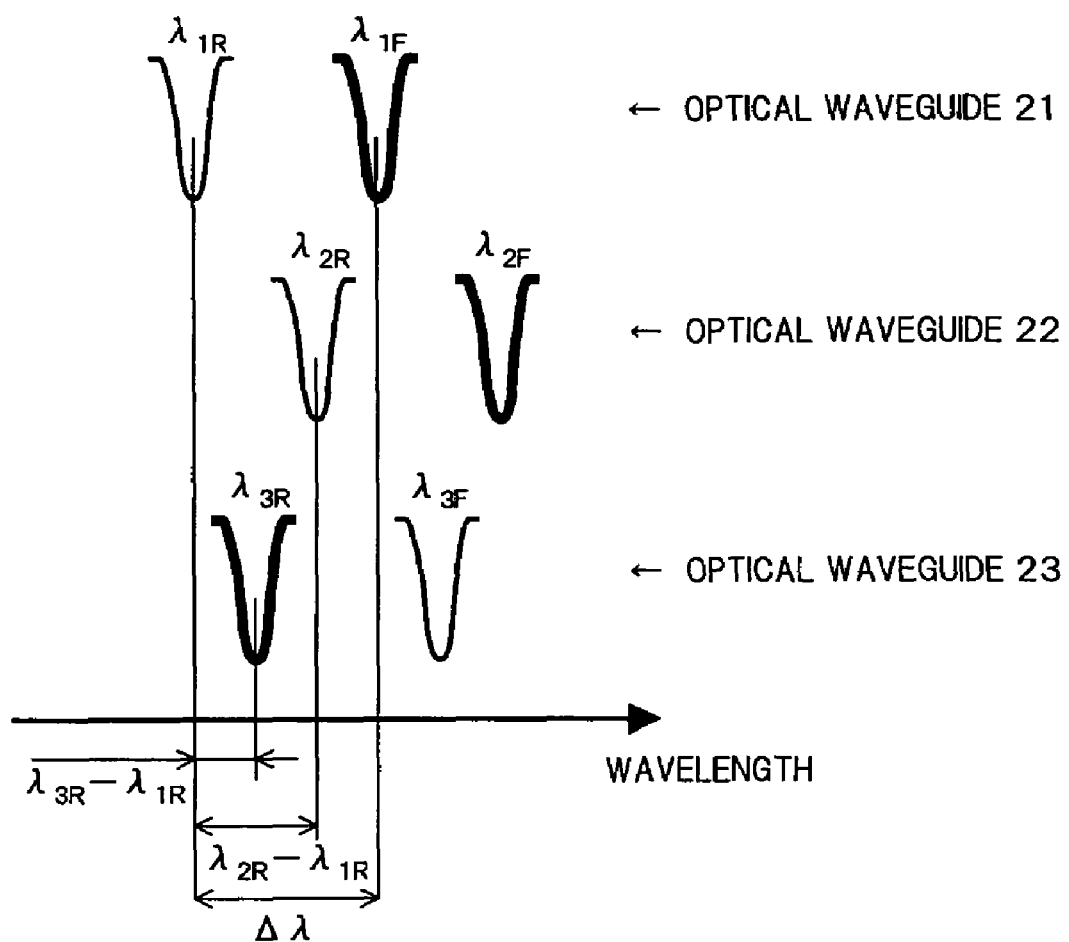
FIG. 15 is a diagram showing relationships among the selected wavelengths at respective stages set in the optical wavelength variable filter in FIG. 6.

In the constitution of FIG. 6, the setting of the blocked wavelengths (selected wavelength) corresponding to the optical waveguides 21 to 23 on the substrate 10 is indicated in the relationship as shown in FIG. 15. Therefore, for the light given to the substrate 10 via the connecting optical path $2_B$ and propagated sequentially through the optical waveguides 21, 23 and 22, the monitoring is performed on the dropped light in the optical waveguide 21 corresponding to the wavelength $\lambda_{1F}$ positioned substantially at the center of the blocking band, depending on the relationship of blocking wavelength as shown by a bold line in the figure. Moreover, for the light given to the substrate 10 via the connecting optical path $2_C$ and propagated sequentially through the optical waveguides 22, 23 and 21, the monitoring is performed on the dropped light in the optical waveguide 22 corresponding to the wavelength $\lambda_{2R}$, depending on the relationship of blocking wavelength as shown by a thin line in the figure.

Based on the peak wavelengths of dropped lights detected in the above manner, the wavelength deviation amount to the previously set control value (selected wavelength) is obtained based on the monitoring result by the second monitoring section 200, and a controlling signal for correcting the frequency of RF signal is generated according to the wavelength deviation amount, to be output to the RF signal generating circuit 40. Then, in the RF signal generating circuit 40, in accordance with the controlling signal from the RF signal controlling section 300, the frequency f of RF signal is corrected and the corrected RF signal is applied commonly to the IDTs 41 to 43 at the respective stages. Thus, even if the filter characteristic is changed due to a change in temperature, deterioration with time lapse or the like, it becomes possible to block reliably and stably a light desired wavelength from passing through, by tracking and controlling the frequency of RF signal.

Further, herein, at the starting time or at the alteration of setting, a process for previously detecting the control value of the AOTFs cascade loop connected on the substrate 10 is executed by the RF signal controlling section 300 based on the monitor signal M2 from the second monitoring section 200. In the second monitoring section 200, there is monitored the light passed through the monitoring AOTFs that operate in accordance with the same parameter as for the three staged AOTFs cascade connected on the substrate 10. That is, the branched light from the optical coupler 201 on the input optical path $2_{IN}$ is polarization split by the PBS 202. One of the polarization lights is given, as a TE mode light, to the PBS 231a on the optical waveguide 221 of the substrate 10 via the connecting Optical path $2_G$, to be propagated within the optical waveguide 221 toward the PBS 231b. At this time, due to the acousto-optic effect of SAW generated at the IDT 241 and propagated through the SAW guide 251, only the light, corresponding to the selected wavelength out of the TE mode light being propagated within the optical waveguide 221 is mode converted into a TM mode light. Then, when the respective mode lights reach the PBS 231b, the mode converted TM mode light of selective wavelength passes therethrough and is sent to the PBS 204 via the connecting optical path $2_I$.

On the contrary, the other polarization light polarization split by the PBS 202 is rotated with polarization plane thereof by 90 degrees by the polarization rotating section 203, and then given, as a TE mode light, to the PBS 232b on the optical waveguide 222 of the substrate 10 via the connecting optical path $2_H$, to be propagated within the optical waveguide 222 toward the PBS 232a. At this time, due to the acousto-optic effect of SAW generated at the IDT 242 and propagated through the SAW guide 252, only the light corresponding to the selected wavelength out of the TE mode light being propagated within the optical waveguide 222 is mode converted into a TM light. Then, when the respective mode lights reach the PBS 232a, the mode converted TM mode light of selective wavelength passes therethrough, and is rotated with polarization plane thereof by 90 degrees by the polarization rotating section 205 and then sent to the PBS 204 via the connecting optical path $2_J$.

In the PBS 204, the polarization lights with polarization planes being orthogonal to each other from the connecting optical paths $2_I$ and $2_J$, are multiplexed to be sent to the light receiver 206. In the light receiver 206, the monitor signal from the PBS 204 is converted into an electrical signal, to be output to the RF signal controlling section 300, as the monitor signal M2.

In the RF signal controlling section 300, at the starting time or at the alteration of setting, a controlling signal for sweeping the frequency of RF signal within a required range is generated, to be output to the RF signal generating circuit 40. Then, the wavelengths of lights actually selected by the monitoring AOTFs on the substrate 10 are detected based on the monitor signal M2 from the second monitoring section 200, corresponding to the RF signals of respective swept frequencies, and in accordance with the detection result, the RF signal frequency corresponding to a desired selected wavelength is judged to be initially set as a control value for the starting time or the time of alteration of setting.

The control value set based on the monitor signal M2 from the second monitoring section 200, is determined in accordance with the wavelengths of lights actually passed through the monitoring AOTFs that operate in accordance with the same control parameter (frequency of RF signal) for the AOTFs cascade connected that process the main signal light, and therefore, can achieve an extremely higher precision, compared with a value obtained by using a monitoring device that operates in accordance with a different control parameter. In the optical wavelength variable filter to be used for the OXC apparatus, OADM apparatus or the like, if the light of wavelength that is needed to pass through, is erroneously blocked, the services to the users are suspended. Therefore, the control parameter requires a high precision in the initial value thereof. Accordingly, it is very useful that the controlling function of RF signal based on the monitoring result by the second monitoring section 200 is provided in the optical wavelength variable filter.

According to the control apparatus 3a of the above optical wavelength variable filter 1, the frequency of RF signal to be given to the respective AOTFs cascade loop connected on the substrate 10, is controlled by using the control value set based on the monitor signal M2 of the second monitoring section 200. Therefore, since the selected wavelengths in the respective AOTFs are adjusted to optimum values immediately after the optical wavelength variable filter 1 is started or is altered with the setting thereof, it becomes possible to ensure a desired filter characteristic of the optical wavelength variable filter 1.

Note, in the above embodiment, as a specific example of the optical device, the use of AOTF has been described. However, the optical device in the present invention is not limited to AOTF.

For example, an electrically optic tunable filter (EOTF) that selects an optical signal of desired wavelength by utilizing the electro-optic effect, may be the optical device in the present invention. This EOTF is an optical wavelength filter that arranges electrodes of predetermined shape along an optical waveguide formed on the substrate having, for example, the electro-optic effect, and selectively separates only the optical signal of desired wavelength due to the electro-optic effect based on the electric field generated by applying a required voltage to the electrodes.

Further, for example, the control system according to the present invention may be adopted to an optical device utilizing the thermo-optic effect. As one example of the optical device utilizing the thermo-optic effect, there is a thermo-optic switch (TO switch) or the like. Specifically, in such a constitution where thin film heaters heated by applied with current are provided on two optical waveguides formed, for example, on a silicon substrate or the like, and the respective optical waveguides are given with different heats by the thin film heaters, respectively, so that the refractive indexes of the optical waveguides are changed due to the thermo-optic effect, respectively, and phases of lights being propagated through the optical waveguides are changed, this TO switch is an optical device that controls the interference state of the light at the juncture of the optical waveguides by the heat given by the thin film heaters, to perform the switching of input light.

Moreover, for example, the control system according to the present invention may be adopted to an optical device using a so-called MEMS mirror made by applying a micro-machining (MEMS) technique. Specifically, in such a constitution where a movable plate supported by a torsion bar and formed with a mirror on the upper face thereof, is formed integrally on a silicon substrate, and the movable plate is rotated by an electromagnetic force with the torsion bar as the axis, this optical device using the MEMS mirror is an optical device capable of switching optical paths by variably controlling the swinging angle of the mirror.

In the above mentioned various optical devices to which the control system of the present invention can be adopted, the optical device for main signal and the monitoring optical device can be integrated on the same substrate, in the same manner as for the AOTFs in the embodiments mentioned above, thereby enabling to realize a higher accurate control.

What is claimed is:

1. A control apparatus comprising:
    a first processing section that performs a predetermined processing on a signal light;
    a signal light branching section provided on a former stage of the first processing section;
    a second processing section that is input with the signal light branched by the signal light branching section, to perform a predetermined processing on the input signal light;
    a monitor section that monitors the signal light output from the second processing section;
    a control section that changes a control signal to be given to the second processing section according to a monitor result of the monitor section, and controls the first processing section using the changed control signal; and
    a sweep section that sweeps a control parameter used by the control signal to be given to the second processing section to control the second processing section, independently of a control parameter used by the control section to control the first processing section.

2. An apparatus comprising:
    a signal light branching section branching a signal light into a first light and a second light;
    a first processing section performing processing on the first light in accordance with a first control signal;
    a second processing section performing processing on the second light in accordance with a second control signal, to thereby output a processed second light;
    a monitor section monitoring the processed second light, and thereby producing a monitor result; and
    a control section producing the first and second control signals in accordance with the monitor result; and
    a sweep section that sweeps a control parameter used by the second control signal, independently of a control parameter used by the first control section to control the first processing section.

* * * * *